United States Patent
Manmohan et al.

(10) Patent No.: US 9,342,550 B1
(45) Date of Patent: May 17, 2016

(54) SYSTEMS AND METHODS FOR PREVENTING DATA LOSS VIA TEMPORARY-FILE GENERATING APPLICATIONS

(71) Applicant: Symantec Corporation, Mountain View, CA (US)

(72) Inventors: Sarin Sumit Manmohan, Maharashtra (IN); Amit Shinde, Maharashtra (IN)

(73) Assignee: Symantec Corporation, Mountain View, CA (US)

( * ) Notice: Subject to any disclaimer, the term of this patent is extended or adjusted under 35 U.S.C. 154(b) by 168 days.

(21) Appl. No.: 13/944,275

(22) Filed: Jul. 17, 2013

(51) Int. Cl.
*G06F 17/30* (2006.01)
*G06F 11/14* (2006.01)

(52) U.S. Cl.
CPC ...... *G06F 17/30371* (2013.01); *G06F 11/1451* (2013.01); *G06F 11/1458* (2013.01)

(58) Field of Classification Search
CPC ............ G06F 11/1451; G06F 11/1458; G06F 11/1464
USPC .......... 707/640, 646, 647, 653, 661, 674, 686
See application file for complete search history.

(56) References Cited

U.S. PATENT DOCUMENTS 6,957,367 B2 * 10/2005 Keller et al. .................... 714/48
7,991,747 B1    8/2011 Upadhyay et al.
8,671,080 B1 *  3/2014 Upadhyay et al. ............. 707/674
9,058,485 B1 *  6/2015 Manmohan et al.
2004/0044930 A1 * 3/2004 Keller et al. ..................... 714/48

OTHER PUBLICATIONS

Zhang Xiaosong et al., Research and Application of the Transparent Data Encpryption in Intranet Data Leakage Prevention, 2009, IEEE, 376-379.*

"Case Study: Clipboard, Processes, and Temporary File Protection SDK for DLP Product (India)", http://www.apriorit.com/downloads/case-study/CaseStudy-sdk-dlp.pdf, as accessed Apr. 24, 2013, Apriorit Inc., (2010).

* cited by examiner

*Primary Examiner* — Jean B Fleurantin
(74) *Attorney, Agent, or Firm* — ALG Intellectual Property, LLC

(57) ABSTRACT

A computer-implemented method for preventing data loss via temporary-file generating applications may include (1) identifying an application that is configured to update a file by generating a temporary file that includes updated content of the file and replacing the file with the temporary file, (2) detecting an attempt by the application to update the file by detecting an attempt by the application to generate the temporary file and/or an attempt by the application to replace the file with the temporary file, and (3) performing, in response to detecting the attempt by the application to update the file, a data-loss-prevention action on the file instead of the temporary file. Various other methods, systems, and computer-readable media are also disclosed.

20 Claims, 6 Drawing Sheets

SYSTEMS AND METHODS FOR PREVENTING DATA LOSS VIA TEMPORARY-FILE GENERATING APPLICATIONS

BACKGROUND OF THE INVENTION

Due to recent technological advances, individuals and organizations may quickly and easily share, access, and disseminate high volumes of digital information. For many individuals and organizations, the ease with which information may be electronically disseminated is empowering. However, the ubiquity of high-speed Internet access, portable storage devices, and third-party storage services may pose unique challenges for individuals and organizations concerned with preventing the loss and/or exposure of sensitive data. Individuals and organizations are therefore increasingly looking to data-loss-prevention (DLP) solutions to protect their sensitive data.

Conventional DLP systems typically attempt to protect sensitive data through the use of monitoring and filtering technologies that control the usage, storage, and flow of data on computing devices. Unfortunately, conventional DLP systems may inefficiently and/or ineffectively prevent data loss via temporary-file generating applications that indirectly update files using one or more temporary files to protect against data loss. For example in some cases, conventional DLP systems may filter temporary files in addition to or instead of filtering the files that they update. Moreover when temporary files violate DLP policies, conventional DLP systems may create misleading and/or confusing incident reports for the violations that include names of the temporary files, which may be unrelated to the names of the files that the temporary files were used to update. As such, the instant disclosure identifies a need for improved methods and systems for preventing data loss via temporary-file generating applications.

SUMMARY OF THE INVENTION

As will be described in greater detail below, the instant disclosure generally relates to systems and methods for preventing data loss via temporary-file generating applications. In one example, a computer-implemented method for preventing data loss via temporary-file generating applications may include (1) identifying an application that is configured to update a file by generating a temporary file that includes updated content of the file and replacing the file with the temporary file, (2) detecting an attempt by the application to update the file by detecting an attempt by the application to generate the temporary file and/or an attempt by the application to replace the file with the temporary file, and (3) performing a data-loss-prevention action on the file instead of the temporary file in response to detecting the attempt by the application to update the file.

In some examples, the method for preventing data loss via temporary-file generating applications may further include (1) detecting an attempt by the application to open the file and (2) creating a backup of the file in response to detecting the attempt by the application to open the file.

In some examples, the application may replace the file with the temporary file by renaming the temporary file to the name of the file, and the step of detecting the attempt by the application to replace the file with the temporary file may include detecting an attempt by the application to rename the temporary file to the name of the file.

In some examples, the application may be configured to update the file by further generating an additional temporary file that includes original content of the file, and the method for preventing data loss via temporary-file generating applications may further include (1) detecting an attempt by the application to generate the additional temporary file and (2) creating a backup of the file in response to detecting the attempt by the application to generate the additional temporary file.

In some examples, the step of performing the data-loss-prevention action on the file instead of the temporary file may include (1) determining whether the file has been modified in response to detecting the attempt by the application to replace the file with the temporary file and (2) flagging the file for scanning for data-loss-prevention policy violations.

In some examples, the method for preventing data loss via temporary-file generating applications may include (1) detecting an attempt by the application to close the file, and the step of performing the data-loss-prevention action on the file instead of the temporary file may include scanning the file for data-loss-prevention policy violations in response to detecting the attempt by the application to close the file.

In some examples, the step of performing the data-loss-prevention action on the file instead of the temporary file may include (1) determining whether the file violates a data-loss-prevention policy and (2) creating an incident report that includes the name of the file instead of the name of the temporary file in response to determining that the file violates the data-loss-prevention policy.

In some examples, the step of performing the data-loss-prevention action on the file instead of the temporary file may include (1) determining whether the file violates a data-loss-prevention policy and (2) replacing the file with a backup of the file that does not violate the data-loss-prevention policy in response to determining that the file violates the data-loss-prevention policy.

In some examples, the step of performing the data-loss-prevention action on the file instead of the temporary file may include (1) scanning the file to determine whether the file contains sensitive data and (2) refraining from scanning the temporary file.

In one embodiment, a system for implementing the above-described method may include (1) an identification module that identifies an application that is configured to update a file by generating a temporary file that includes updated content of the file and replacing the file with the temporary file, (2) a detection module that detects an attempt by the application to update the file by detecting an attempt by the application to generate the temporary file and/or an attempt by the application to replace the file with the temporary file, (3) a data-loss-prevention module that performs a data-loss-prevention action on the file instead of the temporary file in response to detecting the attempt by the application to update the file, and (4) at least one processor that executes the identification module, the detection module, and the data-loss-prevention module.

In some examples, the above-described method may be encoded as computer-readable instructions on a computer-readable-storage medium. For example, a computer-readable-storage medium may include one or more computer-executable instructions that, when executed by at least one processor of a computing device, may cause the computing device to (1) identify an application that is configured to update a file by generating a temporary file that includes updated content of the file and replacing the file with the temporary file, (2) detect an attempt by the application to update the file by detecting an attempt by the application to generate the temporary file and/or an attempt by the application to replace the file with the temporary file, and (3) perform a data-loss-prevention action on the file instead of the temporary file in response to detecting the attempt by the application to update the file.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
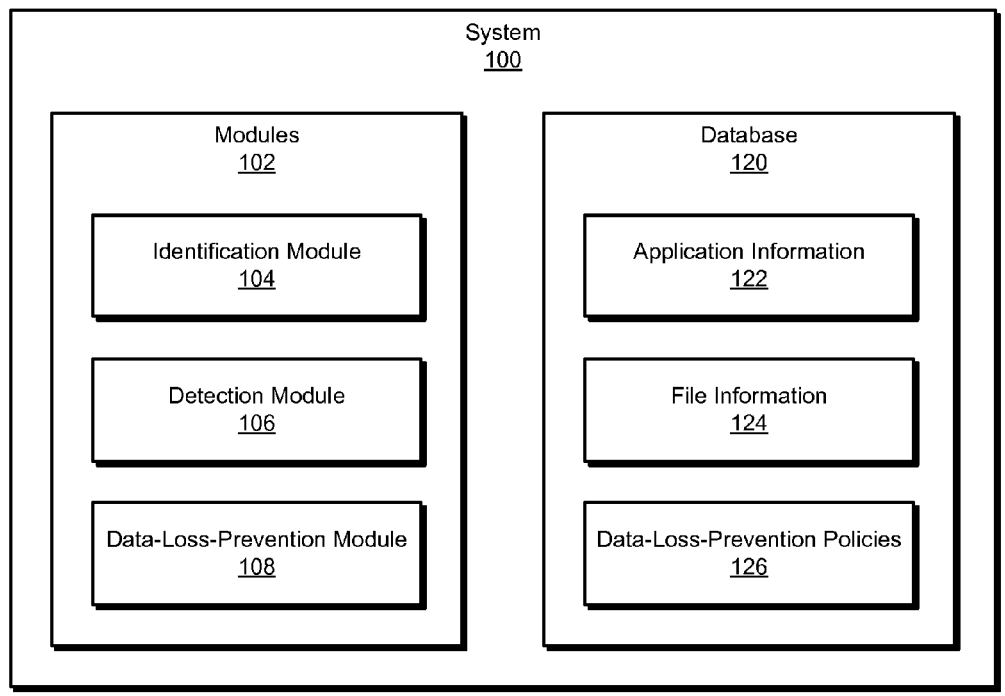
FIG. 1 is a block diagram of an exemplary system for preventing data loss via temporary-file generating applications.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure is generally directed to systems and methods for preventing data loss via temporary-file generating applications. As will be explained in greater detail below, by identifying when applications update files using temporary files, the systems and methods described herein may improve the efficiency and effectiveness of data-loss prevention. Furthermore, in some examples, by detecting when a temporary file has been created by an application for the purpose of updating a file, these systems and methods may ignore (e.g., refrain from scanning) the temporary file and/or may create, in the event that either the file or the temporary file violates a DLP policy, an incident report for forensic analysis that includes the name of the file instead of the name of the temporary file. Moreover, by monitoring how an application updates a file using temporary files, the systems and methods described herein may create one or more backups of the file that may be used to restore the file if the file later violates a DLP policy. Embodiments of the instant disclosure may also provide various other advantages and features, as discussed in greater detail below.

Figure 2:
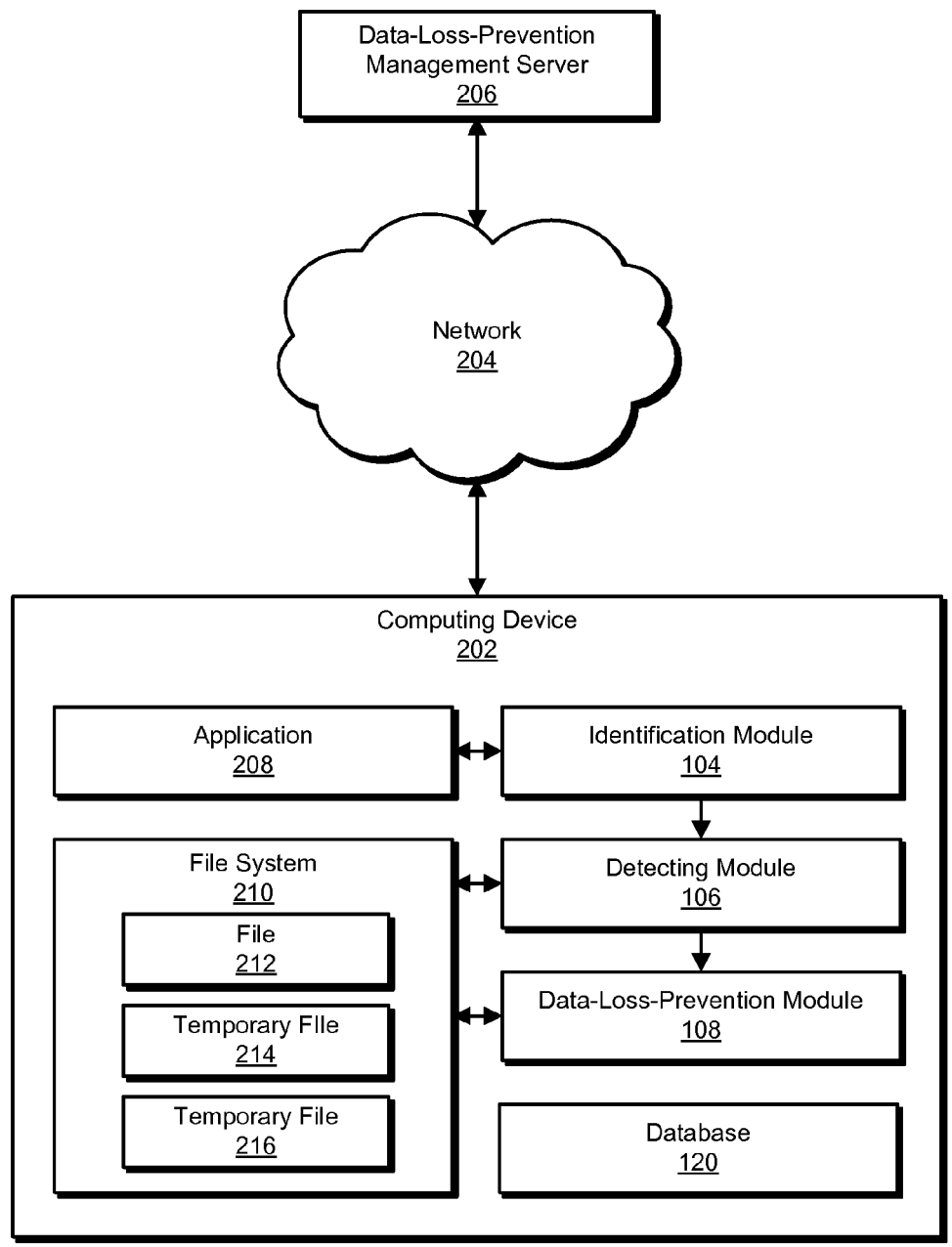
FIG. 2 is a block diagram of an exemplary system for preventing data loss via temporary-file generating applications.

The following will provide, with reference to FIGS. 1-2, detailed descriptions of exemplary systems for preventing data loss via temporary-file generating applications. Detailed descriptions of corresponding computer-implemented methods will also be provided in connection with FIGS. 3-4. In addition, detailed descriptions of an exemplary computing system and network architecture capable of implementing one or more of the embodiments described herein will be provided in connection with FIGS. 5 and 6, respectively.

FIG. 1 is a block diagram of an exemplary system 100 for preventing data loss via temporary-file generating applications. As illustrated in this figure, exemplary system 100 may include one or more modules 102 for performing one or more tasks. For example, and as will be explained in greater detail below, exemplary system 100 may include an identification module 104 that identifies an application that is configured to update a file by generating a temporary file that includes updated content of the file and replacing the file with the temporary file. Exemplary system 100 may also include a detection module 106 that detects an attempt by the application to update the file by detecting an attempt by the application to generate the temporary file and/or an attempt by the application to replace the file with the temporary file.

In addition, and as will be described in greater detail below, exemplary system 100 may include a data-loss-prevention module 108 that performs a data-loss-prevention action on the file instead of the temporary file in response to detecting the attempt by the application to update the file. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent software modules stored and configured to run on one or more computing devices, such as the devices illustrated in FIG. 2 (e.g., computing device 202 and/or server 206), computing system 510 in FIG. 5, and/or portions of exemplary network architecture 600 in FIG. 6. One or more of modules 102 in FIG. 1 may also represent all or portions of one or more special-purpose computers configured to perform one or more tasks.

As illustrated in FIG. 1, exemplary system 100 may also include one or more databases, such as database 120. In one example, database 120 may include application information 122 for storing information about one or more temporary-file generating applications, file information 124 for storing information about one or more files and/or temporary files, and data-loss-prevention policies 126 for storing information about one or more data-loss-prevention policies. In some examples, application information 122 may include information that may be used to identify temporary-file generating applications (e.g., application or process names), and file information 124 may include information that may be used to identify the temporary files that they generate (e.g., temporary-file names and/or naming conventions).

Database 120 may represent portions of a single database or computing device or a plurality of databases or computing devices. For example, database 120 may represent a portion of server 206 in FIG. 2, computing system 510 in FIG. 5, and/or portions of exemplary network architecture 600 in FIG. 6. Alternatively, database 120 in FIG. 1 may represent one or more physically separate devices capable of being accessed by a computing device, such as server 206 in FIG. 2, computing system 510 in FIG. 5, and/or portions of exemplary network architecture 600 in FIG. 6.

Exemplary system 100 in FIG. 1 may be implemented in a variety of ways. For example, all or a portion of exemplary system 100 may represent portions of exemplary system 200 in FIG. 2. As shown in FIG. 2, system 200 may include a computing device 202 in communication with a data-loss-prevention management server 206 via a network 204. Computing device 202 may be programmed with one or more of modules 102 and/or may store all or a portion of the data in database 120. Additionally or alternatively, server 206 may be programmed with one or more of modules 102 and/or may store all or a portion of the data in database 120.

In one embodiment, one or more of modules 102 from FIG. 1 may, when executed by at least one processor of computing device 202 and/or server 206, facilitate computing device 202 and/or server 206 in preventing data loss via temporary-file generating applications. For example, and as will be described in greater detail below, one or more of modules 102 may cause computing device 202 and/or server 206 to (1) identify an application 208 that may be configured to update a file 212 by generating a temporary file 214 that includes updated contents of file 212 and replacing file 212 with temporary file 214, (2) detect an attempt by application 208 to update file 212 by detecting an attempt by application 208 to generate temporary file 214 and/or an attempt by application 208 to replace file 212 with temporary file 214, and (3) perform a data-loss-prevention action on file 212 instead of temporary file 214 in response to detecting the attempt by application 208 to update file 212 (e.g., when temporary file 214 is renamed using the original filename of file 212).

Computing device 202 generally represents any type or form of computing device capable of reading computer-executable instructions. Examples of computing device 202 include, without limitation, laptops, tablets, desktops, servers, cellular phones, Personal Digital Assistants (PDAs), multimedia players, embedded systems, combinations of one or more of the same, exemplary computing system 510 in FIG. 5, or any other suitable computing device. It should be understood that computing device 202 may employ any of a number of computer operating systems, including, but by no means limited to, known versions and/or varieties of the MICROSOFT WINDOWS, UNIX, MACINTOSH, AND LINUX operating systems.

As shown in FIG. 2, computing device 202 may include an application 208 that is capable of creating and/or accessing files (e.g., file 212, temporary file 214, and temporary file 216) stored within and/or managed by a file system 210. Application 208 may represent any application that generates temporary files and/or updates files using temporary files. In some examples, application 208 may represent an application that does not write data directly to a file but that instead writes data indirectly to the file via one or more temporary files. For example, application 208 may update file 212 by writing updated contents of file 212 to temporary file 214 and by replacing (e.g., renaming) file 212 with temporary file 214. In some examples, application 208 may temporarily store the original and/or updated contents of a file to one or more temporary files to protect against data loss in the event that an error occurs as the file is being saved. Examples of application 208 may include, without limitation, a MICROSOFT OFFICE application, WORDPAD, and/or an OPENOFFICE application. In some examples, file system 210 may represent a collection of files, a system for managing a collection of files, and/or a system for managing input/output operations to files stored to various storage media (e.g., attached, removable, or network-based storage).

Server 206 generally represents any type or form of computing device that is capable of reading computer-executable instructions. Examples of server 206 include, without limitation, application servers and database servers configured to provide various database services and/or run certain software applications. In some examples, server 206 may represent a system for managing DLP policies on one or more client devices (e.g., computing device 202). In at least one example, server 206 may represent a system for gathering information about DLP incidents from the one or more client devices.

Network 204 generally represents any medium or architecture capable of facilitating communication or data transfer. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), exemplary network architecture 600 in FIG. 6, or the like. Network 204 may facilitate communication or data transfer using wireless or wired connections. In one embodiment, network 204 may facilitate communication between computing device 202 and server 206.

Figure 3:
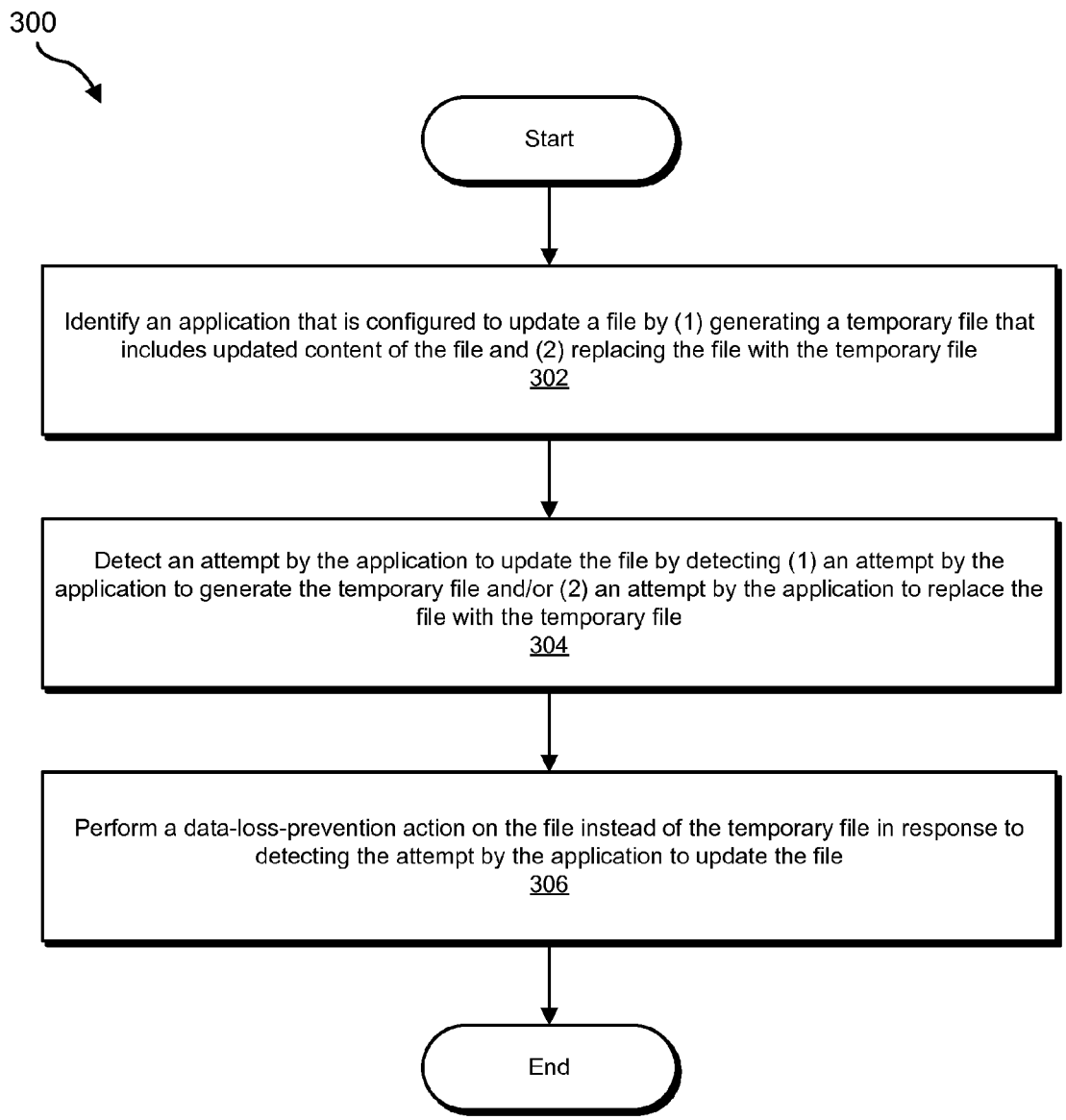
FIG. 3 is a flow diagram of an exemplary method for preventing data loss via temporary-file generating applications.

FIG. 3 is a flow diagram of an exemplary computer-implemented method 300 for preventing data loss via temporary-file generating applications. The steps shown in FIG. 3 may be performed by any suitable computer-executable code and/or computing system. In some embodiments, the steps shown in FIG. 3 may be performed by one or more of the components of system 100 in FIG. 1, system 200 in FIG. 2, computing system 510 in FIG. 5, and/or portions of exemplary network architecture 600 in FIG. 6.

As illustrated in FIG. 3, at step 302 one or more of the systems described herein may identify an application that is configured to update a file by (1) generating a temporary file that includes updated contents of the file and (2) replacing the file with the temporary file. For example, at step 302 identification module 104 may, as part of computing device 202 in FIG. 2, identify application 208 that is configured to update file 212 by generating temporary file 214 that includes updated contents of file 212 and by replacing file 212 with temporary file 214.

As used herein, the terms "application" and/or "temporary-file generating application" may refer to any application, group of applications, process, and/or group of processes that generates one or more temporary files while updating a file. The terms "file" and/or "temporary file," as used herein, may refer to any suitable unit of data, including, without limitation, a file, data object, data segment, portion of a data stream, database, database entry, and/or electronic document. In some examples, the term "temporary file," as used herein, may refer to any file that may be used by an application to store the contents of a file (e.g., updated or original contents of a file) while the file is being updated.

In some examples, an application may update a file by writing data indirectly to the file via one or more temporary files instead of writing data directly to the file. For example, an application may update the contents of a file by simply writing updated contents of the file to a temporary file and by replacing the file with the temporary file. In at least one example, an application may replace the file with the temporary file by renaming the temporary file using the original filename of the file. An application may temporarily store the original and/or updated contents of a file to one or more temporary files to protect against data loss in the event that an error occurs as the file is being saved. Examples of applications that may update files using temporary files may include, without limitation, a MICROSOFT OFFICE application, WORDPAD, and/or an OPENOFFICE application.

Figure 4:
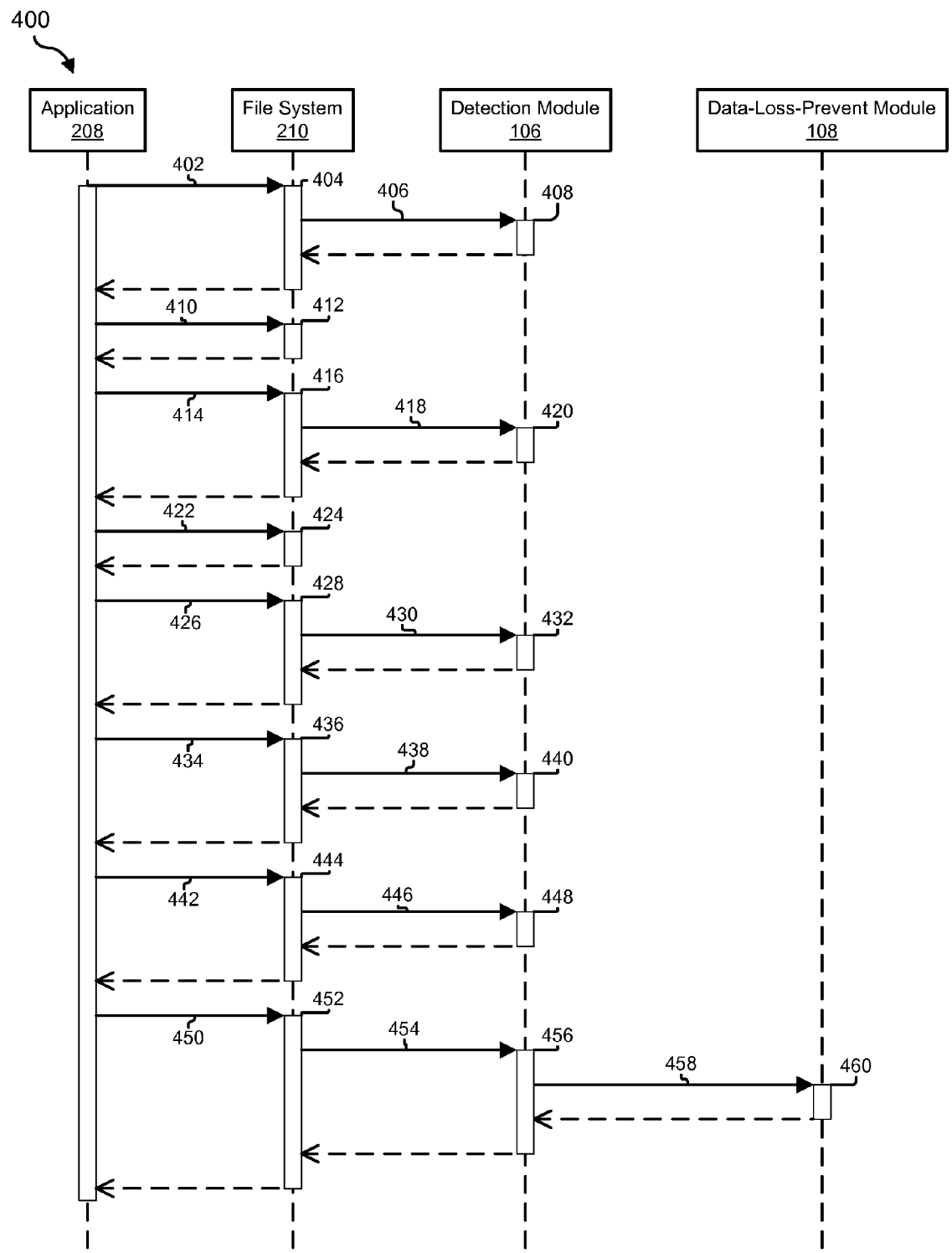
FIG. 4 is a diagram of an exemplary sequence for updating files using temporary files.

FIG. 4 is a sequence diagram of an exemplary file-update sequence 400 that illustrates how application 208 may indirectly update file 212 using temporary files 214 and 216. As shown in FIG. 4 at step 402, application 208 may first send a request to file system 210 to open file 212. If application 208 is running within a MICROSOFT WINDOWS' operating system, application 208 may send a request to file system 210 to open file 212 by calling a CREATEFILE function of file system 210 that requests access to file 212. At step 404, file system 210 may provide, in response to the request, a handle or pointer to file 212 to application 208 by which application 208 may access file 212.

At step 410, application 208 may send a request to file system 210 to read the contents of file 212. If application 208 is running within a MICROSOFT WINDOWS' operating system, application 208 may send a request to file system 210 to read the contents of file 212 by calling a READFILE function of file system 210 that requests some or all of the contents of file 210. At step 412, file system 210 may provide, in response to the request, the requested contents of file 212 to application 208. In some examples, application 208 may then update the contents of file 212 (e.g., a user may use application 208 to update the contents of file 212).

At step 414, application 208 may begin to update file 212 by sending a request to file system 210 to create temporary file 214. If application 208 is running within a MICROSOFT WINDOWS' operating system, application 208 may send a request to file system 210 to create temporary file 214 by calling a CREATEFILE function of file system 210 that causes file system 210 to create a new temporary file. At step 416, file system 210 may create temporary file 214 in response to the request and may provide a handle or pointer to temporary file 214 to application 208 by which application 208 may access temporary file 214.

At step 422, application 208 may send a request to file system 210 to write updated contents of file 212 to temporary file 214. If application 208 is running within a MICROSOFT WINDOWS' operating system, application 208 may send a request to file system 210 to write updated contents of file 212 to temporary file 214 by calling a WRITEFILE function of file system 210 that requests that the updated contents of file 212 be written to temporary file 214. At step 424, file system 210 may write, in response to the request, the updated contents of file 212 to temporary file 214. After step 424 has been completed, file 212 may contain the original contents of file 212 (e.g., the contents of file 212 prior to step 402), and temporary file 214 may contain the updated contents of file 212.

At step 426, application 208 may send a request to file system 210 to close temporary file 214. If application 208 is running within a MICROSOFT WINDOWS' operating system, application 208 may send a request to file system 210 to close temporary file 214 by calling a CLOSEHANDLE function of file system 210 that requests that file system 210 close temporary file 214. At step 428, file system 210 may close, in response to the request, temporary file 214.

At step 434, application 208 may send a request to file system 210 to generate temporary file 216 from file 212. If application 208 is running within a MICROSOFT WINDOWS' operating system, application 208 may send a request to file system 210 to generate temporary file 216 from file 212 by calling a SETINFORMTIONFILE function of file system 210 that requests that file system 210 rename file 212 such that file 212 becomes temporary file 216. At step 436, file system 210 may generate, in response to the request, temporary file 216 from file 212. After step 436 has been completed, file 212 may no longer exist (e.g., a file with the original filename of file 212 may not exist), temporary file 214 may contain the updated contents of file 212, and temporary file 216 may contain the original contents of file 212.

At step 442, application 208 may send a request to file system 210 requesting that file system 210 replace file 212 with temporary file 214. If application 208 is running within a MICROSOFT WINDOWS' operating system, application 208 may send a request to file system 210 requesting that file system 210 replace file 212 with temporary file 214 by calling a SETINFORMTIONFILE function of file system 210 that requests that file system 210 rename temporary file 214 such that temporary file 214 becomes file 212 (e.g., temporary file 214 may be renamed using the same filename as the original filename of file 212). At step 444, file system 210 may rename, in response to the request, temporary file 214 such that temporary file 214 becomes file 212. After step 444 has been completed, file 212 may contain the updated contents of file 212, temporary file 214 may no longer exist (e.g., a file with the original filename of temporary file 214 may not exist), and temporary file 216 may contain the original contents of file 212. Although not illustrated in FIG. 4, application 208 may update file 212 at least one additional time in the same manner as described above.

At step 450, application 208 may send a request to file system 210 to close file 212. If application 208 is running within a MICROSOFT WINDOWS' operating system, application 208 may send a request to file system 210 to close file 212 by calling a CLOSEHANDLE function of file system 210 that requests that file system 210 close file 212. At step 452, file system 210 may close, in response to the request, file 212. Although not illustrated in FIG. 4, after step 450, application 208 may send a request to file system 210 to delete temporary file 216.

Returning to FIG. 3, the systems described herein may perform step 302 in any suitable manner. In one example, identification module 104 may identify application 208 by reading configuration information that identifies application 208. For example, identification module 104 may identify application 208 by reading application information 122 that identifies application 208. As mentioned above, application information 122 may include information that may be used to identify applications that are configured to update files using temporary files. In another example, identification module 104 may identify application 208 by reading a DLP policy (e.g., from data-loss-prevention policies 126) that indicates that application 208 and/or the files that it accesses should be monitored for DLP policy violations.

Additionally or alternatively, identification module 104 may identify application 208 by identifying (e.g., intercepting, detecting, receiving, or retrieving) an input/output request from application 208. For example in some contexts, identification module 104 may represent a portion of a file system filter (e.g., a FILE-SYSTEM MINIFILTER DRIVER) and may identify application 208 by filtering an input/output request from application 208.

At step 304, one or more of the systems described herein may detect an attempt by the application to update the file by detecting (1) an attempt by the application to generate the temporary file and/or (2) an attempt by the application to replace the file with the temporary file. For example, at step 304 detection module 106 may, as part of computing device 202 in FIG. 2, detect an attempt by application 208 to update file 212 by detecting (1) an attempt by application 208 to generate temporary file 214 and/or (2) an attempt by application 208 to replace file 212 with temporary file 214.

The systems described herein may perform step 304 in any suitable manner. In one example, detection module 106 may detect an attempt by application 208 to update file 212 by monitoring any or all input/output operations from application 208 that are related to updating file 212. Using FIG. 4 as an example, detection module 106 may detect an attempt by application 208 to update file 212 by detecting (1) the request sent at step 402 from application 208 to file system 210 to open file 212, (2) the request sent at step 410 from application 208 to file system 210 to read the contents of file 212, (3) the request sent at step 414 from application 208 to file system 210 to create temporary file 214, (4) the request sent at step 422 from application 208 to file system 210 to write updated contents of file 212 to temporary file 214, (5) the request sent at step 426 from application 208 to file system 210 to close temporary file 214, (6) the request sent at step 434 from application 208 to file system 210 to generate temporary file 216 from file 212, (7) the request sent at step 442 from application 208 to file system 210 to replace file 212 with temporary file 214, and/or (8) the request sent at step 450 from application 208 to file system 210 to close file 212.

In some contexts, detection module 106 may represent a portion of a file system filter (e.g., a FILE SYSTEM MINI-FILTER DRIVER) and may monitor input/output operations from application 208 that are related to updating files as part of the file system filter. In one example, detection module 106 may, as part of a file system filter, register with file system 210 a preoperation callback routine and/or a postoperation callback routine to filter at least one input/output operation that is related to updating files that file system 210 may call each time file system 210 processes the input/output operation.

In some examples, detection module 106 may register preoperation callback routines and/or postoperation callback routines with file system 210 to filter input/output operations that open files, create files, rename files, and/or close files. For example, if detection module 106 is running within a MICROSOFT WINDOWS' operating system, detection module 106 may register preoperation callback routines and/or postoperation callback routines with file system 210 to filter CREATEFILE, SETINFORMATIONFILE, and CLOSEHANDLE function calls to file system 210. By registering callback routings with file system 210, file system 210 may call detection module 106 each time file system 210 processes the above mentioned input/output operations from application 208. In at least one example, detection module 106 may use information contained in application information 122 and file information 124 to determine whether an input/output operation from application 208 involves a temporary file.

Using FIG. 4 as an example, file system 210 may call detection module 106 at step 406 in response to the request sent at step 402 from application 208 to file system 210 to open file 212, at step 418 in response to the request sent at step 414 from application 208 to file system 210 to create temporary file 214, at step 430 in response to the request sent at step 426 from application 208 to file system 210 to close temporary file 214, at step 438 in response to the request sent at step 434 from application 208 to file system 210 to generate temporary file 216 from file 212, at step 446 in response to the request sent at step 442 from application 208 to file system 210 to replace file 212 with temporary file 214, and/or at step 454 in response to the request sent at step 450 from application 208 to file system 210 to close file 212.

In addition or as an alternative to simply detecting when an application updates a file using temporary files, detection module 106 may perform various data-loss-prevention tasks. For example, detection module 106 may flag files that should be scanned by data-loss-prevention module 108 for DLP policy violations. In one example, detection module 106 may flag files updated using temporary files instead of the temporary files used to update the files such that the updated files and not the temporary files are scanned for DLP policy violations. By flagging files updated using temporary files instead of the temporary files used to update them, detection module 106 may ensure that (1) files updated in an indirect manner via temporary files are scanned for DLP policy violations and/or (2) DLP policy violations are detected and reported as DLP policy violations of files updated using temporary files instead of as DLP policy violation of temporary files used to update files.

In some examples, detection module 106 may flag a file for scanning in response to the file being replaced by a temporary file. For example, detection module 106 may flag file 212 for scanning when file 212 is replaced by temporary file 214 (e.g., when temporary file 214 is renamed using the original filename of file 212). Using FIG. 4 as an example, detection module 106 may flag file 212 for scanning at step 448 in response to being called by file system 210 at step 446 to filter the request sent at step 442 from application 208 to file system 210 to replace file 212 with temporary file 214.

In addition or as an alternative to flagging files for scanning, detection module 106 may create backups of files from which the files may be restored in the event that the files violate a DLP policy. For example, detection module 106 may back up file 212 so that file 212 can be restored if file 212 violates a DLP policy or contains sensitive information. As used herein, the term "backup" may refer to any point-in-time copy of a file (e.g., a snapshot).

In some examples, detection module 106 may back up a file before an application opens the file to write to the file. Using FIG. 4 as an example, detection module 106 may back up file 212 at step 408 in response to being called by file system 210 at step 406. In some examples, detection module 106 may also create a backup of a file before an application generates a temporary file from the file. Using FIG. 4 as an example, detection module 106 may back up file 212 at step 440 in response to being called by file system 210 at step 438.

At step 306, one or more of the systems described herein may perform a data-loss-prevention action on the file instead of the temporary file in response to detecting the attempt by the application to update the file. For example, at step 306 data-loss-prevention module 108 may, as part of computing device 202 in FIG. 2, perform a data-loss-prevention action on file 212 instead of on temporary file 214 or temporary file 216 in response to detecting the attempt by application 208 to update file 212 (e.g., when temporary file 214 is renamed using the original filename of file 212). Upon completion of step 306, exemplary method 300 in FIG. 3 may terminate.

The systems described herein may perform step 306 in any suitable manner. In one example, data-loss-prevention module 108 may perform a data-loss-prevention action on a file instead of on the temporary files used to update the file by scanning the file for DLP policy violations and by refraining from scanning the temporary files used to update the file. For example, data-loss-prevention module 108 may scan file 212 for DLP policy violations and refrain from scanning either temporary file 214 or temporary file 216 for DLP policy violations. By intelligently ignoring (e.g., not scanning) the temporary files used to update a file, data-loss-prevention module 108 may efficiently prevent data-loss via temporary-file generating applications and ensure that DLP policy violations are detected and reported as DLP policy violations of files updated using temporary files instead of as DLP policy violation of temporary files used to update files. In some examples, data-loss-prevention module 108 may scan file 212 instead of temporary file 214 or temporary file 216 in response to detection module 106 having flagged file 212 for scanning (e.g., when temporary file 214 is renamed using the original filename of file 212).

In some examples, data-loss-prevention module 108 may scan a file for DLP policy violations in response to an attempt by an application to close the file and/or may refrain from scanning a temporary file when an application attempts to close the temporary file. Using FIG. 4 as an example, at step 458 detection module 106 may notify data-loss-prevention module that application 208 has or is attempting to close file 212. In response to this notification, data-loss-prevention module 108 may scan file 212 at step 460 for DLP policy violations.

In some examples, if data-loss-prevention module 108 determines that a file violates a DLP policy and/or contains sensitive information, data-loss-prevention module 108 may create an incident report that indicates that the file violates a DLP policy and/or contains sensitive information. For example, if data-loss-prevention module 108 determines that file 212 violates a DLP policy and/or contains sensitive information, data-loss-prevention module 108 may create an incident report that indicates that file 212 violates a DLP policy and/or contains sensitive information. When creating an incident report, data-loss-prevention module 108 may include the filename of the file instead of the filename of the temporary files used to update the file. By including the filename of the file and not the filename of the temporary files used to update the file, data-loss-prevention module 108 may ensure that the incident report is meaningful to its recipients. Moreover by reporting the correct filename of the file in the incident report, data-loss-prevention module 108 may ensure that the incident report can be used in forensics analysis to identify correlations between data-loss channels and users and/or owners of files.

In some examples, if data-loss-prevention module 108 determines that a file violates a DLP policy and/or contains sensitive information, data-loss-prevention module 108 may restore the file to a state at which the file does not violate a DLP policy and/or contain sensitive information using one of the backups created by detection module 106 as part of step 304. For example, if data-loss-prevention module 108 determines that file 212 violates a DLP policy and/or contains sensitive information, data-loss-prevention module 108 may restore file 212 to a state at which file 212 does not violate a DLP policy and/or contain sensitive information. In some examples, after restoring a file from a backup and/or upon determining that the file does not violate a DLP policy or contain sensitive information, data-loss-prevention module 108 may delete any existing backups of the file.

As explained above, by identifying when applications update files using temporary files, the systems and methods described herein may improve the efficiency and effectiveness of data-loss prevention. Furthermore, in some examples, by detecting when a temporary file has been created by an application for the purpose of updating a file, these systems and methods may ignore (e.g., refrain from scanning) the temporary file and/or may create, in the event that either the file or the temporary file violates a DLP policy, an incident report for forensic analysis that includes the name of the file instead of the name of the temporary file. Moreover, by monitoring how an application updates a file using temporary files, the systems and methods described herein may create one or more backups of the file that may be used to restore the file if the file later violates a DLP policy.

For example, the systems and methods described herein may (1) identify temporary-file generating applications that update files using temporary files, (2) monitor the input/output operations of the temporary-file generating applications that relate to updating files using temporary files, and (3) detect and report DLP policy violations of files updated using temporary files instead of detecting and reporting DLP policy violation of temporary files used to update files.

Figure 5:
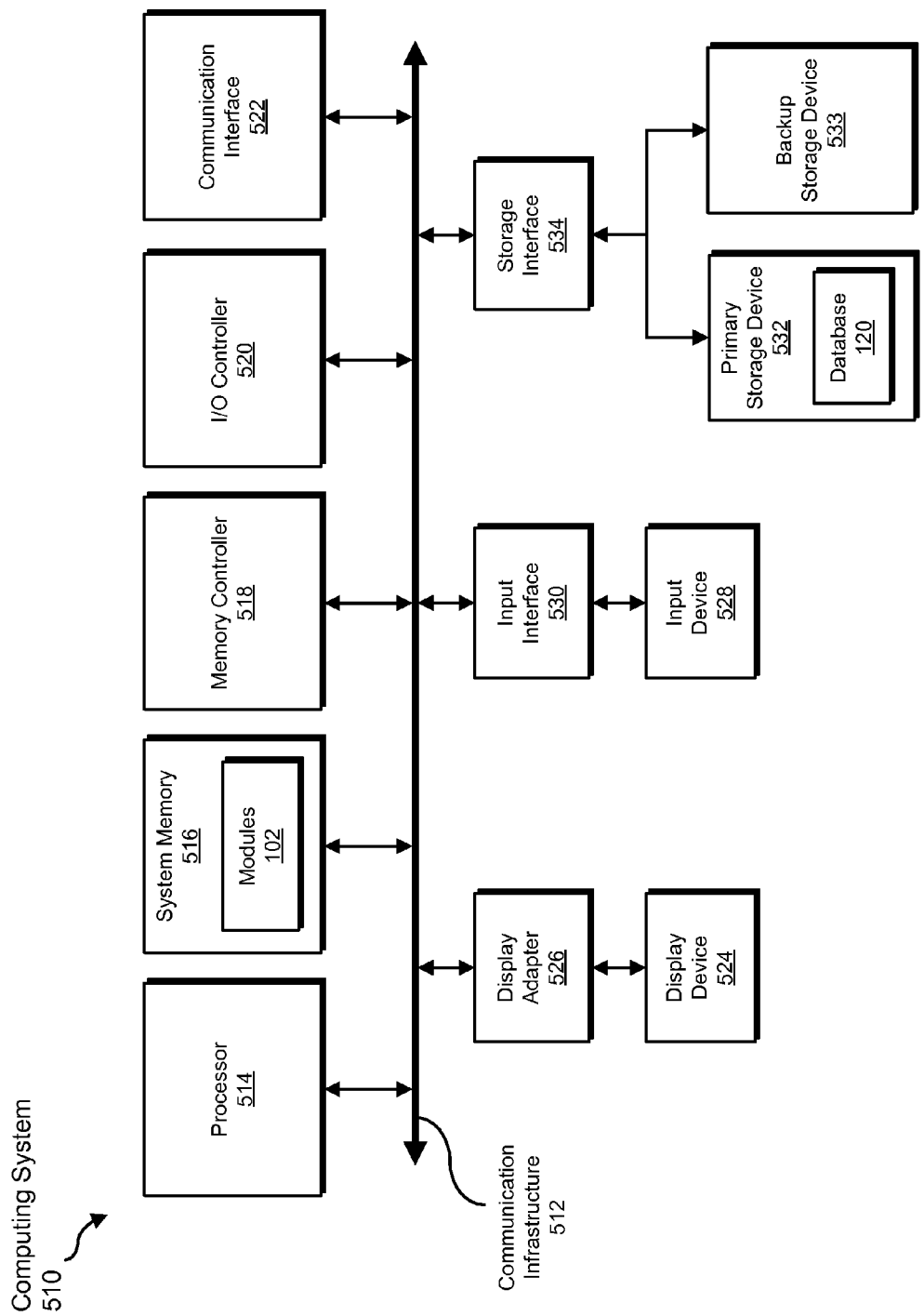
FIG. 5 is a block diagram of an exemplary computing system capable of implementing one or more of the embodiments described and/or illustrated herein.

FIG. 5 is a block diagram of an exemplary computing system 510 capable of implementing one or more of the embodiments described and/or illustrated herein. For example, all or a portion of computing system 510 may perform and/or be a means for performing, either alone or in combination with other elements, one or more of the steps described herein (such as one or more of the steps illustrated in FIG. 3). All or a portion of computing system 510 may also perform and/or be a means for performing any other steps, methods, or processes described and/or illustrated herein.

Computing system 510 broadly represents any single or multi-processor computing device or system capable of executing computer-readable instructions. Examples of computing system 510 include, without limitation, workstations, laptops, client-side terminals, servers, distributed computing systems, handheld devices, or any other computing system or device. In its most basic configuration, computing system 510 may include at least one processor 514 and a system memory 516.

Processor 514 generally represents any type or form of processing unit capable of processing data or interpreting and executing instructions. In certain embodiments, processor 514 may receive instructions from a software application or module. These instructions may cause processor 514 to perform the functions of one or more of the exemplary embodiments described and/or illustrated herein.

System memory 516 generally represents any type or form of volatile or non-volatile storage device or medium capable of storing data and/or other computer-readable instructions. Examples of system memory 516 include, without limitation, Random Access Memory (RAM), Read Only Memory (ROM), flash memory, or any other suitable memory device. Although not required, in certain embodiments computing system 510 may include both a volatile memory unit (such as, for example, system memory 516) and a non-volatile storage device (such as, for example, primary storage device 532, as described in detail below). In one example, one or more of modules 102 from FIG. 1 may be loaded into system memory 516.

In certain embodiments, exemplary computing system 510 may also include one or more components or elements in addition to processor 514 and system memory 516. For example, as illustrated in FIG. 5, computing system 510 may include a memory controller 518, an Input/Output (I/O) controller 520, and a communication interface 522, each of which may be interconnected via a communication infrastructure 512. Communication infrastructure 512 generally represents any type or form of infrastructure capable of facilitating communication between one or more components of a computing device. Examples of communication infrastructure 512 include, without limitation, a communication bus (such as an Industry Standard Architecture (ISA), Peripheral Component Interconnect (PCI), PCI Express (PCIe), or similar bus) and a network.

Memory controller 518 generally represents any type or form of device capable of handling memory or data or controlling communication between one or more components of computing system 510. For example, in certain embodiments memory controller 518 may control communication between processor 514, system memory 516, and I/O controller 520 via communication infrastructure 512.

I/O controller 520 generally represents any type or form of module capable of coordinating and/or controlling the input and output functions of a computing device. For example, in certain embodiments I/O controller 520 may control or facilitate transfer of data between one or more elements of computing system 510, such as processor 514, system memory 516, communication interface 522, display adapter 526, input interface 530, and storage interface 534.

Communication interface 522 broadly represents any type or form of communication device or adapter capable of facilitating communication between exemplary computing system 510 and one or more additional devices. For example, in certain embodiments communication interface 522 may facilitate communication between computing system 510 and a private or public network including additional computing systems. Examples of communication interface 522 include, without limitation, a wired network interface (such as a network interface card), a wireless network interface (such as a wireless network interface card), a modem, and any other suitable interface. In at least one embodiment, communication interface 522 may provide a direct connection to a remote server via a direct link to a network, such as the Internet. Communication interface 522 may also indirectly provide such a connection through, for example, a local area network (such as an Ethernet network), a personal area network, a telephone or cable network, a cellular telephone connection, a satellite data connection, or any other suitable connection.

In certain embodiments, communication interface 522 may also represent a host adapter configured to facilitate communication between computing system 510 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 522 may also allow computing system 510 to engage in distributed or remote computing. For example, communication interface 522 may receive instructions from a remote device or send instructions to a remote device for execution.

As illustrated in FIG. 5, computing system 510 may also include at least one display device 524 coupled to communication infrastructure 512 via a display adapter 526. Display device 524 generally represents any type or form of device capable of visually displaying information forwarded by display adapter 526. Similarly, display adapter 526 generally represents any type or form of device configured to forward graphics, text, and other data from communication infrastructure 512 (or from a frame buffer, as known in the art) for display on display device 524.

As illustrated in FIG. 5, exemplary computing system 510 may also include at least one input device 528 coupled to communication infrastructure 512 via an input interface 530. Input device 528 generally represents any type or form of input device capable of providing input, either computer or human generated, to exemplary computing system 510. Examples of input device 528 include, without limitation, a keyboard, a pointing device, a speech recognition device, or any other input device.

As illustrated in FIG. 5, exemplary computing system 510 may also include a primary storage device 532 and a backup storage device 533 coupled to communication infrastructure 512 via a storage interface 534. Storage devices 532 and 533 generally represent any type or form of storage device or medium capable of storing data and/or other computer-readable instructions. For example, storage devices 532 and 533 may be a magnetic disk drive (e.g., a so-called hard drive), a solid state drive, a floppy disk drive, a magnetic tape drive, an optical disk drive, a flash drive, or the like. Storage interface 534 generally represents any type or form of interface or device for transferring data between storage devices 532 and 533 and other components of computing system 510. In one example, database 120 from FIG. 1 may be stored in primary storage device 532.

In certain embodiments, storage devices 532 and 533 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 532 and 533 may also include other similar structures or devices for allowing computer software, data, or other computer-readable instructions to be loaded into computing system 510. For example, storage devices 532 and 533 may be configured to read and write software, data, or other computer-readable information. Storage devices 532 and 533 may also be a part of computing system 510 or may be a separate device accessed through other interface systems.

Many other devices or subsystems may be connected to computing system 510. Conversely, all of the components and devices illustrated in FIG. 5 need not be present to practice the embodiments described and/or illustrated herein. The devices and subsystems referenced above may also be interconnected in different ways from that shown in FIG. 5. Computing system 510 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable-storage medium. The phrase "computer-readable-storage medium" generally refers to any form of device, carrier, or medium capable of storing or carrying computer-readable instructions. Examples of computer-readable-storage media include, without limitation, transmission-type media, such as carrier waves, and non-transitory-type media, such as magnetic-storage media (e.g., hard disk drives and floppy disks), optical-storage media (e.g., Compact Disks (CDs) or Digital Video Disks (DVDs)), electronic-storage media (e.g., solid-state drives and flash media), and other distribution systems.

The computer-readable-storage medium containing the computer program may be loaded into computing system 510. All or a portion of the computer program stored on the computer-readable-storage medium may then be stored in system memory 516 and/or various portions of storage devices 532 and 533. When executed by processor 514, a computer program loaded into computing system 510 may cause processor 514 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 510 may be configured as an Application Specific Integrated Circuit (ASIC) adapted to implement one or more of the exemplary embodiments disclosed herein.

Figure 6:
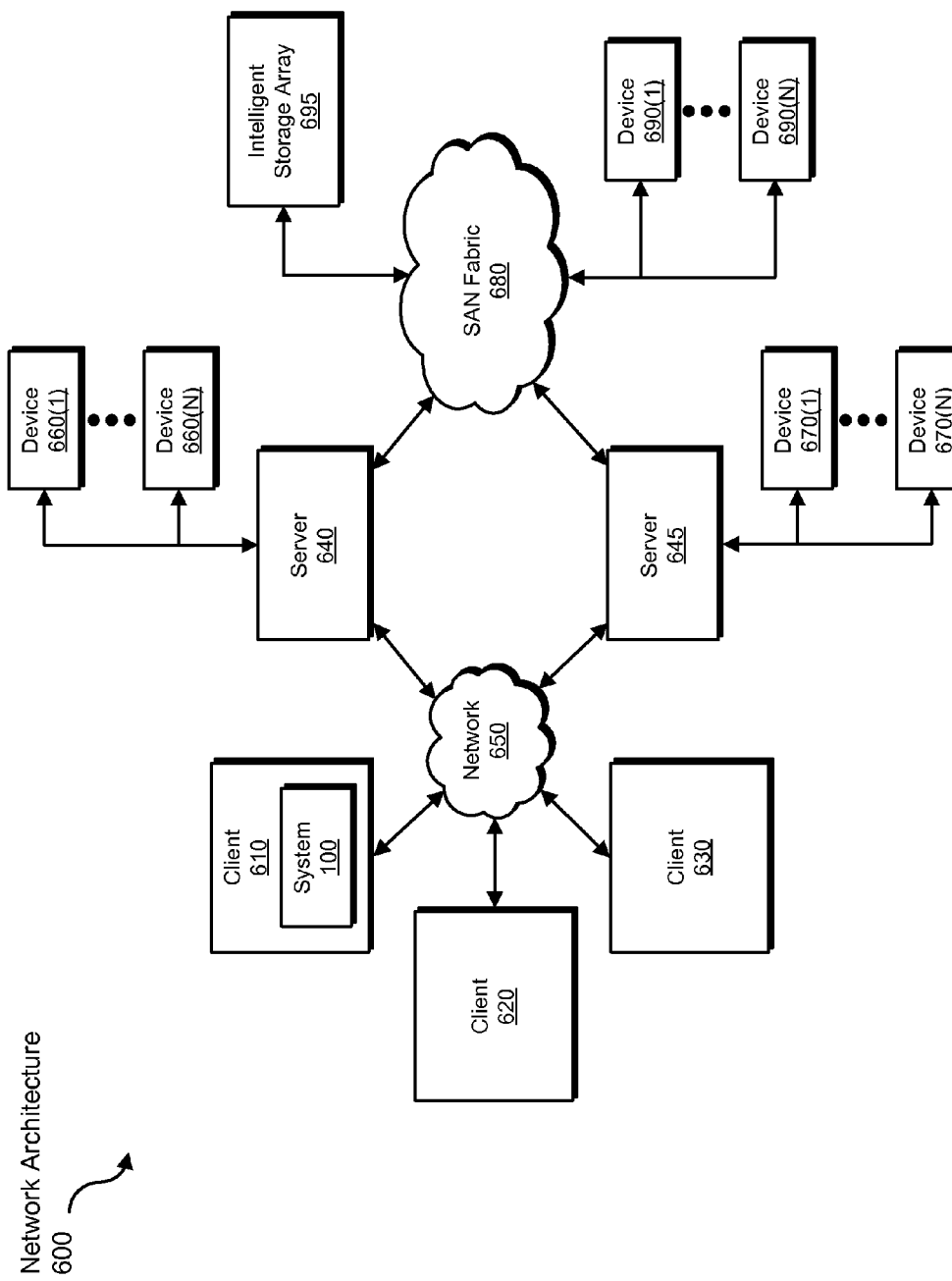
FIG. 6 is a block diagram of an exemplary computing network capable of implementing one or more of the embodiments described and/or illustrated herein.

FIG. 6 is a block diagram of an exemplary network architecture 600 in which client systems 610, 620, and 630 and servers 640 and 645 may be coupled to a network 650. As detailed above, all or a portion of network architecture 600 may perform and/or be a means for performing, either alone or in combination with other elements, one or more of the steps disclosed herein (such as one or more of the steps illustrated in FIG. 3). All or a portion of network architecture 600 may also be used to perform and/or be a means for performing other steps and features set forth in the instant disclosure.

Client systems 610, 620, and 630 generally represent any type or form of computing device or system, such as exemplary computing system 510 in FIG. 5. Similarly, servers 640 and 645 generally represent computing devices or systems, such as application servers or database servers, configured to provide various database services and/or run certain software applications. Network 650 generally represents any telecommunication or computer network including, for example, an intranet, a WAN, a LAN, a PAN, or the Internet. In one example, client systems 610, 620, and/or 630 and/or servers 640 and/or 645 may include all or a portion of system 100 from FIG. 1.

As illustrated in FIG. 6, one or more storage devices 660(1)-(N) may be directly attached to server 640. Similarly, one or more storage devices 670(1)-(N) may be directly attached to server 645. Storage devices 660(1)-(N) and storage devices 670(1)-(N) generally represent any type or form of storage device or medium capable of storing data and/or other computer-readable instructions. In certain embodiments, storage devices 660(1)-(N) and storage devices 670(1)-(N) may represent Network-Attached Storage (NAS) devices configured to communicate with servers 640 and 645 using various protocols, such as Network File System (NFS), Server Message Block (SMB), or Common Internet File System (CIFS).

Servers 640 and 645 may also be connected to a Storage Area Network (SAN) fabric 680. SAN fabric 680 generally represents any type or form of computer network or architecture capable of facilitating communication between a plurality of storage devices. SAN fabric 680 may facilitate communication between servers 640 and 645 and a plurality of storage devices 690(1)-(N) and/or an intelligent storage array 695. SAN fabric 680 may also facilitate, via network 650 and servers 640 and 645, communication between client systems 610, 620, and 630 and storage devices 690(1)-(N) and/or intelligent storage array 695 in such a manner that devices 690(1)-(N) and array 695 appear as locally attached devices to client systems 610, 620, and 630. As with storage devices 660(1)-(N) and storage devices 670(1)-(N), storage devices 690(1)-(N) and intelligent storage array 695 generally represent any type or form of storage device or medium capable of storing data and/or other computer-readable instructions.

In certain embodiments, and with reference to exemplary computing system 510 of FIG. 5, a communication interface, such as communication interface 522 in FIG. 5, may be used to provide connectivity between each client system 610, 620, and 630 and network 650. Client systems 610, 620, and 630 may be able to access information on server 640 or 645 using, for example, a web browser or other client software. Such software may allow client systems 610, 620, and 630 to access data hosted by server 640, server 645, storage devices 660(1)-(N), storage devices 670(1)-(N), storage devices 690(1)-(N), or intelligent storage array 695. Although FIG. 6 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 640, server 645, storage devices 660(1)-(N), storage devices 670(1)-(N), storage devices 690(1)-(N), intelligent storage array 695, or any combination thereof. All or a portion of one or more of the exemplary embodiments disclosed herein may also be encoded as a computer program, stored in server 640, run by server 645, and distributed to client systems 610, 620, and 630 over network 650.

As detailed above, computing system 510 and/or one or more components of network architecture 600 may perform and/or be a means for performing, either alone or in combination with other elements, one or more steps of an exemplary method for preventing data loss via temporary-file generating applications.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of exemplary system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of exemplary system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of exemplary system 100 in FIG. 1 may be implemented within a virtual environment. For example, modules and/or data described herein may reside and/or execute within a virtual machine. As used herein, the phrase "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the phrase "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of exemplary system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of exemplary system 100 in FIG. 1 may represent portions of, interact with, consume data produced by, and/or produce data consumed by one or more systems for information management. As used herein, the phrase "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of exemplary system 100 in FIG. 1 may represent portions of, produce data protected by, and/or communicate with one or more systems for information security. As used herein, the phrase "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of exemplary system 100 in FIG. 1 may represent portions of, communicate with, and/or receive protection from one or more systems for endpoint security. As used herein, the phrase "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable-storage media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of the modules recited herein may receive an indication that an application has generated one or more temporary files, transform the indication into a determination that the application is indirectly updating a file using the one or more temporary files, output a result of the transformation to a DLP system configured to scan files for DLP policy violations, use the result of the transformation to detect a DLP violation, and store the result of the transformation as part of a DLP incident report that includes the name of the file instead of a name of the temporary files. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for preventing data loss via temporary-file generating applications, at least a portion of the method being performed by a computing device comprising at least one processor, the method comprising:
   identifying an application that is configured to update a file using one or more temporary files, the application being configured to update the file by:

generating a temporary file that comprises updated content of the file;
replacing the file with the temporary file;
detecting, before a data-loss-prevention policy violation involving the file is detected and before a data-loss-prevention policy violation involving the temporary file is detected, an attempt by the application to update the file;
performing, before a data-loss-prevention policy violation involving the file is detected and before a data-loss-prevention policy violation involving the temporary file is detected, a data-loss-prevention action on the file instead of the temporary file in response to detecting the attempt by the application to update the file, wherein performing the data-loss-prevention action on the file instead of the temporary file comprises:
scanning the file to determine whether the file contains sensitive data;
refraining from scanning the temporary file to determine whether the temporary file contains sensitive data.

2. The computer-implemented method of claim 1, further comprising:
detecting an attempt by the application to open the file;
creating, in response to detecting the attempt by the application to open the file, a backup of the file.

3. The computer-implemented method of claim 1, wherein:
detecting the attempt by the application to update the file comprises detecting an attempt by the application to replace the file with the temporary file;
the application replaces the file with the temporary file by renaming the temporary file to the name of the file;
detecting the attempt by the application to replace the file with the temporary file comprises detecting an attempt by the application to rename the temporary file to the name of the file.

4. The computer-implemented method of claim 1, wherein the application is configured to update the file by further generating an additional temporary file that comprises original content of the file;
further comprising:
detecting an attempt by the application to generate the additional temporary file;
creating, in response to detecting the attempt by the application to generate the additional temporary file, a backup of the file.

5. The computer-implemented method of claim 1, wherein:
detecting the attempt by the application to update the file comprises detecting an attempt by the application to replace the file with the temporary file;
performing the data-loss-prevention action on the file instead of the temporary file comprises:
determining, in response to detecting the attempt by the application to replace the file with the temporary file, whether the file has been modified;
flagging, in response to determining that the file has been modified, the file for scanning for data-loss-prevention policy violations.

6. The computer-implemented method of claim 1, further comprising detecting an attempt by the application to close the file, wherein performing the data-loss-prevention action on the file instead of the temporary file comprises scanning, in response to detecting the attempt by the application to close the file, the file for data-loss-prevention policy violations.

7. The computer-implemented method of claim 1, wherein performing the data-loss-prevention action on the file instead of the temporary file comprises:
determining whether the file violates a data-loss-prevention policy;
creating, in response to determining that the file violates the data-loss-prevention policy, an incident report that includes the name of the file instead of the name of the temporary file.

8. The computer-implemented method of claim 1, wherein performing the data-loss-prevention action on the file instead of the temporary file comprises:
determining whether the file violates a data-loss-prevention policy;
replacing, in response to determining that the file violates the data-loss-prevention policy, the file with a backup of the file that does not violate the data-loss-prevention policy.

9. The computer-implemented method of claim 1, wherein detecting the attempt by the application to update the file comprises detecting at least one of:
an attempt by the application to generate the temporary file;
an attempt by the application to replace the file with the temporary file.

10. A system for preventing data loss via temporary-file generating applications, the system comprising:
an identification module that identifies an application that is configured to update a file using one or more temporary files, the application being configured to update the file by:
generating a temporary file that comprises updated content of the file;
replacing the file with the temporary file;
a detection module that detects, before a data-loss-prevention policy violation involving the file is detected and before a data-loss-prevention policy violation involving the temporary file is detected, an attempt by the application to update the file;
a data-loss-prevention module that performs, before a data-loss-prevention policy violation involving the file is detected and before a data-loss-prevention policy violation involving the temporary file is detected, a data-loss-prevention action on the file instead of the temporary file in response to the detection of the attempt by the application to update the file, wherein the data-loss-prevention module performs the data-loss-prevention action on the file instead of the temporary file by:
scanning the file to determine whether the file contains sensitive data;
refraining from scanning the temporary file to determine whether the temporary file contains sensitive data;
at least one processor that executes the identification module, the detection module, and the data-loss-prevention module.

11. The system of claim 10, wherein the detection module further:
detects an attempt by the application to open the file;
creates, in response to detecting the attempt by the application to open the file, a backup of the file.

12. The system of claim 10, wherein:
the detection module detects the attempt by the application to update the file by detecting an attempt by the application to replace the file with the temporary file;
the application replaces the file with the temporary file by renaming the temporary file to the name of the file;
the detection module detects the attempt by the application to replace the file with the temporary file by detecting an attempt by the application to rename the temporary file to the name of the file.

13. The system of claim 10, wherein:
the application is configured to update the file by further generating an additional temporary file that comprises original content of the file;
the detection module further:
   detects an attempt by the application to generate the additional temporary file;
   creates, in response to detecting the attempt by the application to generate the additional temporary file, a backup of the file.

14. The system of claim 10, wherein:
the detection module detects the attempt by the application to update the file by detecting an attempt by the application to replace the file with the temporary file;
the data-loss-prevention module performs the data-loss-prevention action on the file instead of the temporary file by:
   determining, in response to detecting the attempt by the application to replace the file with the temporary file, whether the file has been modified;
   flagging, in response to determining that the file has been modified, the file for scanning for data-loss-prevention policy violations.

15. The system of claim 10, wherein:
the detection module further detects an attempt by the application to close the file;
the data-loss-prevention module performs the data-loss-prevention action on the file instead of the temporary file by scanning, in response to detecting the attempt by the application to close the file, the file for data-loss-prevention policy violations.

16. The system of claim 10, wherein the data-loss-prevention module performs the data-loss-prevention action on the file instead of the temporary file by:
   determining whether the file violates a data-loss-prevention policy;
   creating, in response to determining that the file violates the data-loss-prevention policy, an incident report that includes the name of the file instead of the name of the temporary file.

17. The system of claim 10, wherein the data-loss-prevention module performs the data-loss-prevention action on the file instead of the temporary file by:
   determining whether the file violates a data-loss-prevention policy;
   replacing, in response to determining that the file violates the data-loss-prevention policy, the file with a backup of the file that does not violate the data-loss-prevention policy.

18. The system of claim 10, wherein the detection module detects the attempt by the application to update the file by detecting at least one of:
   an attempt by the application to generate the temporary file;
   an attempt by the application to replace the file with the temporary file.

19. A non-transitory computer-readable storage medium comprising one or more computer-executable instructions that, when executed by at least one processor of a computing device, cause the computing device to:
   identify an application that is configured to update a file using one or more temporary files, the application being configured to update the file by:
      generating a temporary file that comprises updated content of the file;
      replacing the file with the temporary file;
   detect, before a data-loss-prevention policy violation involving the file is detected and before a data-loss-prevention policy violation involving the temporary file is detected, an attempt by the application to update the file;
   perform, before a data-loss-prevention policy violation involving the file is detected and before a data-loss-prevention policy violation involving the temporary file is detected, a data-loss-prevention action on the file instead of the temporary file in response to detecting the attempt by the application to update the file, wherein performing the data-loss-prevention action on the file instead of the temporary file comprises:
      scanning the file to determine whether the file contains sensitive data;
      refraining from scanning the temporary file to determine whether the temporary file contains sensitive data.

20. The non-transitory computer-readable medium of claim 19, wherein the one or more computer-executable instructions, when executed by the processor of the computing device, cause the computing device to:
   detect an attempt by the application to open the file;
   create, in response to detecting the attempt by the application to open the file, a backup of the file.

* * * * *